March 19, 1940.  M. A. BLU  2,194,272
WELDING
Filed Dec. 31, 1936

Inventor
Marshall A. Blu
By Frank H. Marks,
Atty.

Patented Mar. 19, 1940

2,194,272

UNITED STATES PATENT OFFICE 2,194,272

WELDING

Marshall A. Blu, Chicago, Ill., assignor to Sears, Roebuck and Co., Chicago, Ill., a corporation of New York Application December 31, 1936, Serial No. 118,457

5 Claims. (Cl. 219—10)

This invention relates to the art of welding pieces of metal to each other and more particularly wherein one piece is tubular and the other piece is either tubular or flat. The invention disclosed is particularly useful in connection with electrical welding where a heavy current is passed across the junction whose resistance is such as to raise the temperature of the opposing metallic surfaces to welding values. It is customary to have the two parts to be welded pressed together with considerable force so that the molten metal at the joint is squeezed out to form a bur. It is desirable in many instances to have the weld present a smooth finished appearance so that no grinding or removal of surplus metal is necessary. In the manufacture of such articles as bicycles and other similar devices, it is customary to weld tubular members and thereafter grind down the welded surface to present a smooth appearance ready for painting. Such procedure is expensive and time consuming and in addition tends to weaken the weld in instances where the grinding is too deep.

An object of this invention is to prepare the parts to be welded and provide a method of welding so that the displaced metal will be permitted to flow but be concealed. Another object is to provide a method of welding which will result in a strong union and have a finished appearance. Other and additional objects will occur to those skilled in the art in connection with the description.

Referring to the drawing.

Figure 1:
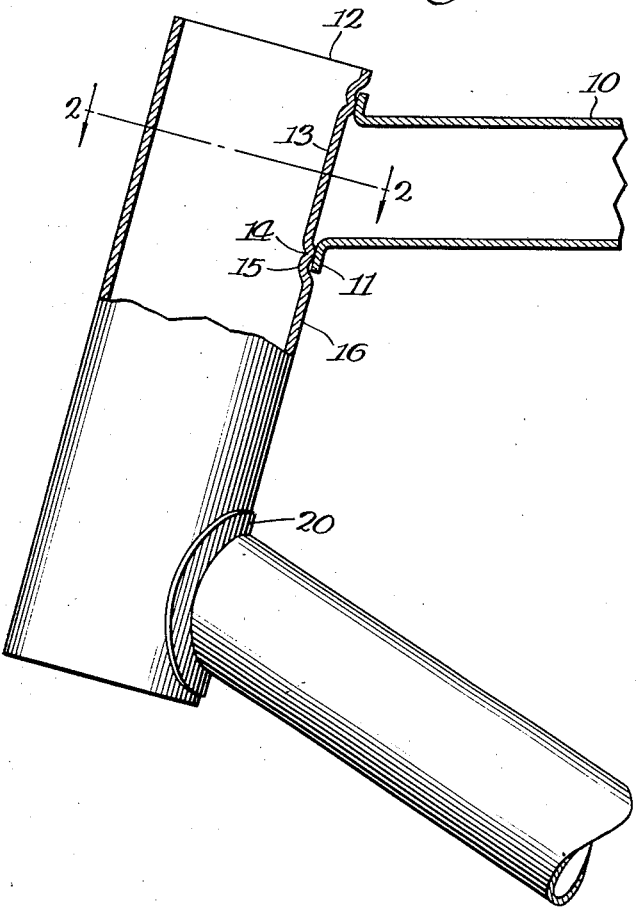
Figure 1 shows part of a bicycle frame partly in cross section illustrating the preparation of the parts to be welded.
Figure 2:
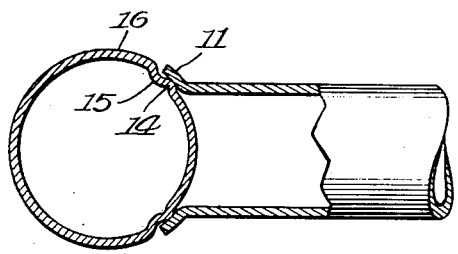
Figure 2 is a section on line 2—2 of Figure 1.

A tubular member 10 has its end bent outwardly at 11 to form a plate-like part or flange. Tubular part 12, to which 10 is to be welded has a central portion 13 bent or forced inwardly to form a recess. The margin of this recess is provided with a protuberance 14 surrounded in turn by a depression 15, the two having a wavy cross section as shown in the drawing. As is clearly evident from the drawing, flange 11 is large enough to rest upon protruding portion 14 and extend over depression 15, as well as over the edge of recess 13.

When welding occurs, the flange 11 tends to flatten out protuberance 14 and the metal displaced at the opposing surfaces runs on both sides of the weld to fill the depression 15 and also around the border of recess 13. The finished weld, as shown at 20, is such that no burs or rough masses of metal are visible, being hidden by flange 11.

If desired, the recessing of part 13 may be omitted and reliance be had upon the metal flowing along on the inside of tube 10 adjacent the flange. However, it is preferred to depress protuberance 14 and recess 15 below the level 16 of the surrounding metal so that flange 11 does not project too far outwardly.

Obviously, center portion 13 of tube 12 may be cut out entirely in the event that communication between two pipes is desired. Also it is obvious that tube 12 need not necessarily be of the shape shown and may have a flat face at the welding portion. In fact, tube 12 may be readily replaced by a flat block or plate and the surface prepared as illustrated.

Having described the invention, what is claimed is:

1. The method of electrically welding a pair of metal members, comprising the steps of forming one member with a depression and an annular rib within the periphery of, and of less depth than, the depression so as to form between said periphery and said rib an annular trough, providing a second metal member with a smooth annular surface whose peripheral shape is similar to that of the aforesaid periphery, projecting said second member into said depression with said surface disposed in said depression and engaging the crest of the rib and overlying only a part of said trough, and pressing together and passing an electric current through the engaged portions of said surface and crest so as to fuse them, the displaced metal flowing into said trough between said surface and the first member.

2. The method of welding together a pair of metal members, comprising the steps of preparing the surface of one member with an annular depression, one of whose confining walls is higher than the other, forming the other member with an annular plate-like part having a peripheral edge whose contour corresponds with that of said depression and whose diameter is intermediate the diameters of said walls, placing said part in engagement with the top of the lower wall and in overlying relation to only a part of said depression, with said edge in said depression and so spaced from said higher wall as to avoid fusion between said edge and said higher wall during the welding operation, and said part adjacent said edge projecting only slightly out of said depression, and pressing together and applying a welding heat to the engaged portions of said part and said top so as to fuse them, the displaced metal flowing into said depression under said part until the outer surface of said part lies substantially flush with and spaced from the top of said higher wall.

3. The method of welding together a pair of metal members, comprising the steps of preparing a surface of one member with an annular depression, one of whose confining walls is higher than the other, forming the other member with an annular surface having an edge having a contour corresponding with that of said depression, placing said other member in engagement with the top of the lower wall and in overlying relation to only a part of said depression, with said edge in said depression and so spaced from said walls as to avoid fusion of said edge, the distance from said top to said higher wall being such that said top will be engaged throughout with said other member irrespective of the proximity of said edge to said higher wall, and pressing together and applying a welding heat to the engaged portions of said other member and said top so as to fuse them, the displaced material flowing into said depression under said other member.

4. The method of welding together a pair of metal members, comprising the steps of preparing a surface of one member with an annular depression, one of whose confining walls is higher than the other, forming the other member with an annular surface having an edge having a contour corresponding with that of said depression, placing said other member in engagement with the top of the lower wall and in overlying relation to only a part of said depression, with said edge in said depression and so spaced from said walls as to avoid fusion of said edge, and pressing together and applying a welding heat to said other member and top so that the depressed material flows into said depression under said other member.

5. The method of electrically welding a metal tube to another metal member, consisting in providing a welding flange with a smooth welding surface on the tube, forming in said member a recess somewhat smaller than said flange, with a rim for said recess having a wave-shaped cross section, with the crest of the wave below metal surrounding the rim, the crest being of a size for engagement with said surface, forming said surface to have a line contact with said crest to afford a high electrical resistance, holding said crest and surface interengaged with said surface only partially bridging the trough between said rim and said metal leaving a space between the outer periphery of said surface and the outer periphery of said trough, and passing an electric current through the interengaged parts to fuse them and to weld the tube and member together.

MARSHALL A. BLU.